United States Patent
Dziak et al.

(10) Patent No.: US 7,952,824 B2
(45) Date of Patent: May 31, 2011

(54) SYSTEMS AND METHODS FOR DEFECTIVE MEDIA REGION IDENTIFICATION

(75) Inventors: Scott M. Dziak, Fort Collins, CO (US); Nayak Ratnakar Aravind, Lancaster, PA (US)

(73) Assignee: Agere Systems Inc., Allentown, PA (US)

( * ) Notice: Subject to any disclaimer, the term of this patent is extended or adjusted under 35 U.S.C. 154(b) by 211 days.

(21) Appl. No.: 12/399,679

(22) Filed: Mar. 6, 2009

(65) Prior Publication Data

US 2010/0226031 A1 Sep. 9, 2010

(51) Int. Cl.
G11B 27/36 (2006.01)

(52) U.S. Cl. .......................................... 360/31
(58) Field of Classification Search .................. None
See application file for complete search history.

(56) References Cited

U.S. PATENT DOCUMENTS

| | | | |
|---|---|---|---|
| 6,065,149 A | 5/2000 | Yamanaka | |
| 6,310,739 B1 * | 10/2001 | McEwen et al. | 360/25 |
| 6,691,263 B2 | 2/2004 | Vasic et al. | |
| 6,738,948 B2 | 5/2004 | Dinc et al. | |
| 6,980,382 B2 | 12/2005 | Hirano et al. | |
| 7,154,936 B2 | 12/2006 | Bjerke et al. | |
| 7,168,030 B2 | 1/2007 | Ariyoshi | |
| 7,203,015 B2 | 4/2007 | Sakai et al. | |
| 7,237,173 B2 | 6/2007 | Morita et al. | |
| 7,254,192 B2 | 8/2007 | Onggosanusi | |
| 7,257,172 B2 | 8/2007 | Okamoto et al. | |
| 7,359,313 B2 | 4/2008 | Chan et al. | |
| 7,441,174 B2 | 10/2008 | Li et al. | |
| 7,688,915 B2 | 3/2010 | Tanrikulu et al. | |
| 2002/0023248 A1 * | 2/2002 | Suzuki et al. | 714/764 |
| 2002/0176200 A1 * | 11/2002 | Trivedi | 360/77.12 |
| 2003/0063405 A1 | 4/2003 | Jin et al. | |
| 2007/0061687 A1 | 3/2007 | Hwang | |
| 2007/0274419 A1 * | 11/2007 | Lee et al. | 375/343 |
| 2009/0235116 A1 | 9/2009 | Tan et al. | |
| 2009/0235146 A1 | 9/2009 | Tan et al. | |
| 2009/0268575 A1 | 10/2009 | Tan et al. | |
| 2009/0268848 A1 | 10/2009 | Tan et al. | |
| 2009/0271670 A1 | 10/2009 | Tan et al. | |
| 2010/0042877 A1 | 2/2010 | Tan | |
| 2010/0074078 A1 | 3/2010 | Yang et al. | |

FOREIGN PATENT DOCUMENTS

| | | |
|---|---|---|
| JP | 10-145243 | 5/1998 |
| JP | 2007-087529 | 4/2007 |

OTHER PUBLICATIONS

U.S. Appl. No. 12/399,679, filed Mar. 6, 2009, Dziak, Scott. U.S. Appl. No. 12/399,713, filed Mar. 6, 2009, Weijun Tan.
U.S. Appl. No. 12/399,750, filed Mar. 6, 2009, Weijun Tan.
Kavcic et al., "A Signal-Dependent Autoregressive Channel Model", IEEE Transactions on Magnetics, vol. 35, No. 5, Sep. 1999 pp. 2316-2318.

* cited by examiner

*Primary Examiner* — Daniell L Negrón
*Assistant Examiner* — Regina N Holder
(74) *Attorney, Agent, or Firm* — Hamilton DeSanctis & Cha

(57) ABSTRACT

Various embodiments of the present invention provide systems and methods for storage medium flaw detection. For example, some embodiments provide flaw detection systems that include an input circuit, a data processing circuit and a defect detection circuit. The input circuit is operable to receive an input signal and to provide a filtered output. The data processing circuit is operable to receive the filtered output and to compute a difference between the filtered output and an expected output, and the defect detection circuit receives the difference between the filtered output and the expected output and compares a derivative of the difference with a threshold value, and asserts a defect signal when a magnitude of the derivative of the difference exceeds a threshold value.

20 Claims, 6 Drawing Sheets

SYSTEMS AND METHODS FOR DEFECTIVE MEDIA REGION IDENTIFICATION

BACKGROUND OF THE INVENTION

The present invention is related to storage media. More particularly, the present invention is related to systems and methods for identifying defective regions on a storage medium.

A typical storage medium includes a number of storage locations where data may be stored. Data is written to the medium within areas designated for user data by positioning a read/write head assembly over the medium at a particular location, and subsequently passing a modulated electric current through the head assembly such that a corresponding magnetic flux pattern is induced in the storage medium. To retrieve the stored data, the head assembly is positioned over a track containing the desired information and advanced until it is over the desired data. In this position, the previously stored magnetic flux pattern operates to induce a current in the head assembly. This induced current may then be converted to represent the originally recorded data.

The storage locations on the storage medium are typically arranged as a serial pattern along concentric circles known as tracks. FIG. 1 shows a storage medium 100 with two exemplary tracks 150,155 indicated as dashed lines and written respective distances from an outer perimeter 140. The tracks are segregated by servo data written within wedges 160, 165. These wedges include data and supporting bit patterns that are used for control and synchronization of the head assembly over a desired storage location on storage medium 100. In particular, such wedges traditionally include a preamble pattern followed by a single sector address mark (SAM) as shown by element 110. The SAM is followed by a Gray code, and the Gray code is followed by burst information. It should be noted that while two tracks and two wedges are shown, hundreds of each would typically be included on a given storage medium. Further, it should be noted that a sector may have two or more bursts.

Manufacturing the storage medium includes performing a variety of steps that each must be done in a reasonably homogenous fashion to assure that the storage medium is reliable. For example, some steps include depositing or forming one or more magnetically receptive layers onto an underlying substrate. Where the formed layer is uniform, a consistent susceptibility to magnetic information is expected along with a desired reliability. In contrast, where the layer is not uniform, some regions on the storage medium will exhibit a different degree of susceptibility than others. This varying susceptibility to magnetic information results in an inability to read one or more sectors of the storage medium. These sectors are considered flawed and where possible are not used for storing user data. In some cases, however, such flawed sectors are difficult to identify, and the failure to properly identify the flawed sectors often leads to failure of a manufactured drive and/or loss of user data that is improperly stored to a flawed sector.

Hence, for at least the aforementioned reasons, there exists a need in the art for advanced systems and methods for reducing the likelihood of storing information to flawed regions of a storage medium.

BRIEF SUMMARY OF THE INVENTION

The present invention is related to storage media. More particularly, the present invention is related to systems and methods for identifying defective regions on a storage medium.

Various embodiments of the present invention provide flaw detection systems that include an input circuit, a data processing circuit and a defect detection circuit. The input circuit is operable to receive an input signal and to provide a filtered output. The data processing circuit is operable to receive the filtered output and to compute a difference between the filtered output and an expected output, and the defect detection circuit receives the difference between the filtered output and the expected output and compares a derivative of the difference with a threshold value, and asserts a defect signal when a magnitude of the derivative of the difference exceeds a threshold value.

In some instances of the aforementioned embodiments, the input circuit includes an analog to digital converter that receives an analog input signal and provides a series of digital samples corresponding to the analog input signal, and a digital filter that filters the series of digital samples and provides the filtered output. In various cases, the analog input signal is derived from a periodic data pattern stored on a storage medium.

In one or more instances of the aforementioned embodiments, the data processing circuit includes a data detector circuit and a comparator circuit. The data detector receives the filtered output and is operable to perform a detection on the filtered output to yield an expected output. The comparator circuit is operable to determine the difference between the filtered output and the expected output. In some cases, the data detector is a Viterbi algorithm detector.

In various instances of the aforementioned embodiments, the systems further include a slope detector circuit that determines a slope associated with the expected output, and a multiplier circuit that multiplies the difference between the filtered output and the expected output by the slope. The derivative of the difference between the filtered output and the expected output is the product of the multiplier circuit.

In one or more instances of the aforementioned embodiments, the defect detection circuit includes a moving aggregate filter circuit that incorporates the derivative of the difference with a number of preceding derivatives of the difference to yield an aggregate value. The defect detection circuit also includes a comparator circuit that is operable to assert the defect signal when a magnitude of the derivative of the difference exceeds a threshold value. In some instances of the aforementioned embodiments, the systems further include an analog to digital converter that samples an analog input signal at a sampling frequency and provides a series of digital samples corresponding to the analog input signal, and a digital phase lock loop circuit that is operable to modify the sampling frequency based at least in part on the derivative of the difference.

Other embodiments of the present invention provide methods for identifying defects on a storage medium. Such methods include providing a storage medium having a pattern; receiving a series of samples corresponding to the pattern; calculating an error that corresponds to a difference between the series of samples and a series of expected values; aggregating the error with a number of preceding errors to yield a filtered error value; and asserting a defect signal based at least in part on a comparison between a magnitude of the filtered error value and a threshold. In some cases, the defect signal is asserted when the magnitude of the filtered error value exceeds the threshold.

In various cases, the methods further include identifying a region of the storage medium as unusable. In such cases, the region surrounds a location corresponding to assertion of the defect signal. In particular cases, the region is a sector on the storage medium. In one or more instances of the aforementioned embodiments, calculating the error includes providing a data detector that applies a data detection algorithm to the series of samples to provide an ideal output, providing a partial response target filter that filters the ideal output using a partial response target to yield the series of expected values, and subtracting the series of expected values from the series of samples to yield an interim error, wherein the interim error corresponds to the error. In some cases, the methods further include calculating a slope for each of the values of the ideal output. In such cases, the error corresponding to the difference between the series of samples and a series of expected values is interim error multiplied by the slope corresponding to the respective interim error.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to storage media. More particularly, the present invention is related to systems and methods for identifying defective regions on a storage medium.

Figure 1:
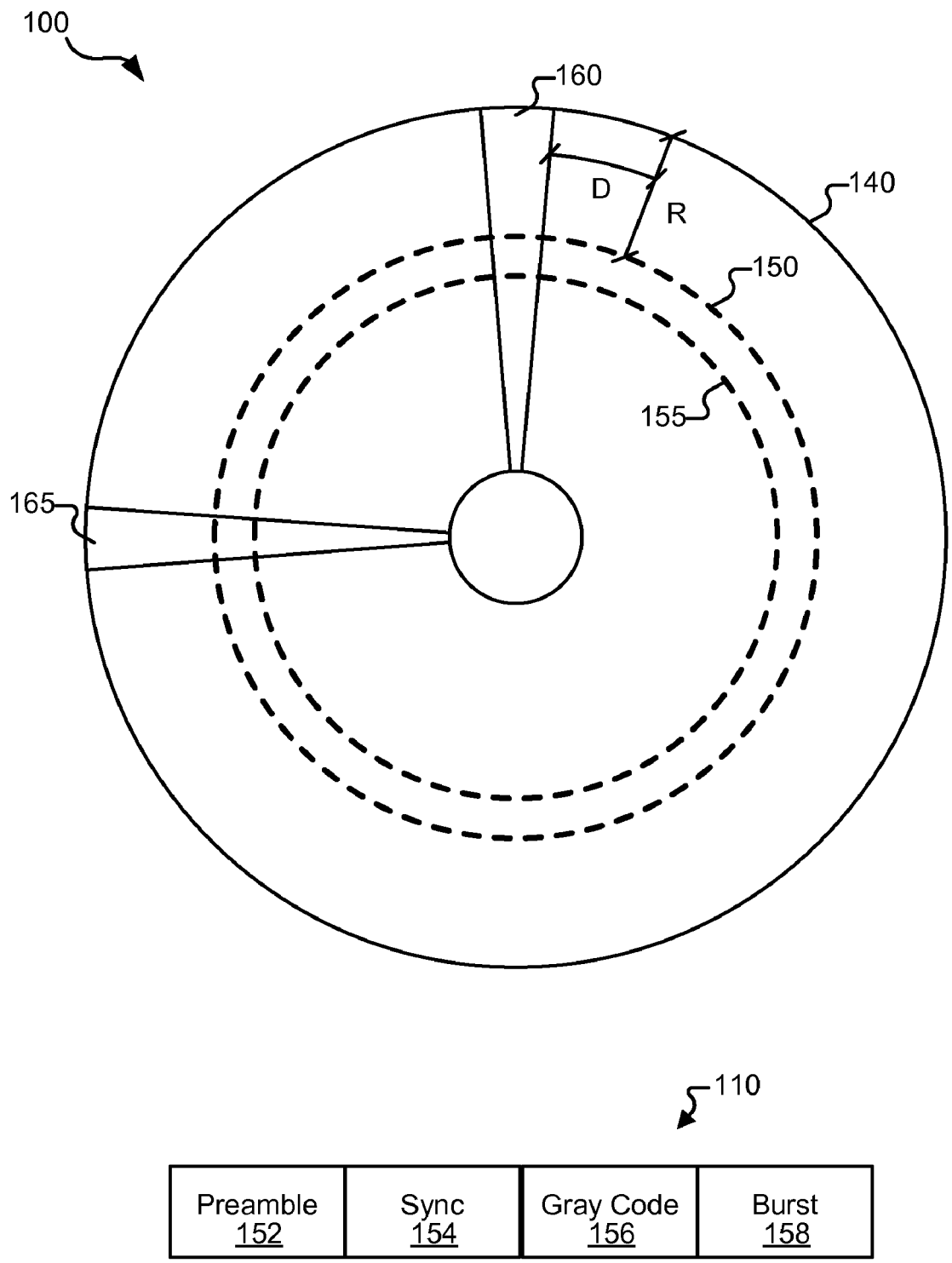
FIG. 1 depicts a known storage medium layout.
Figure 2:
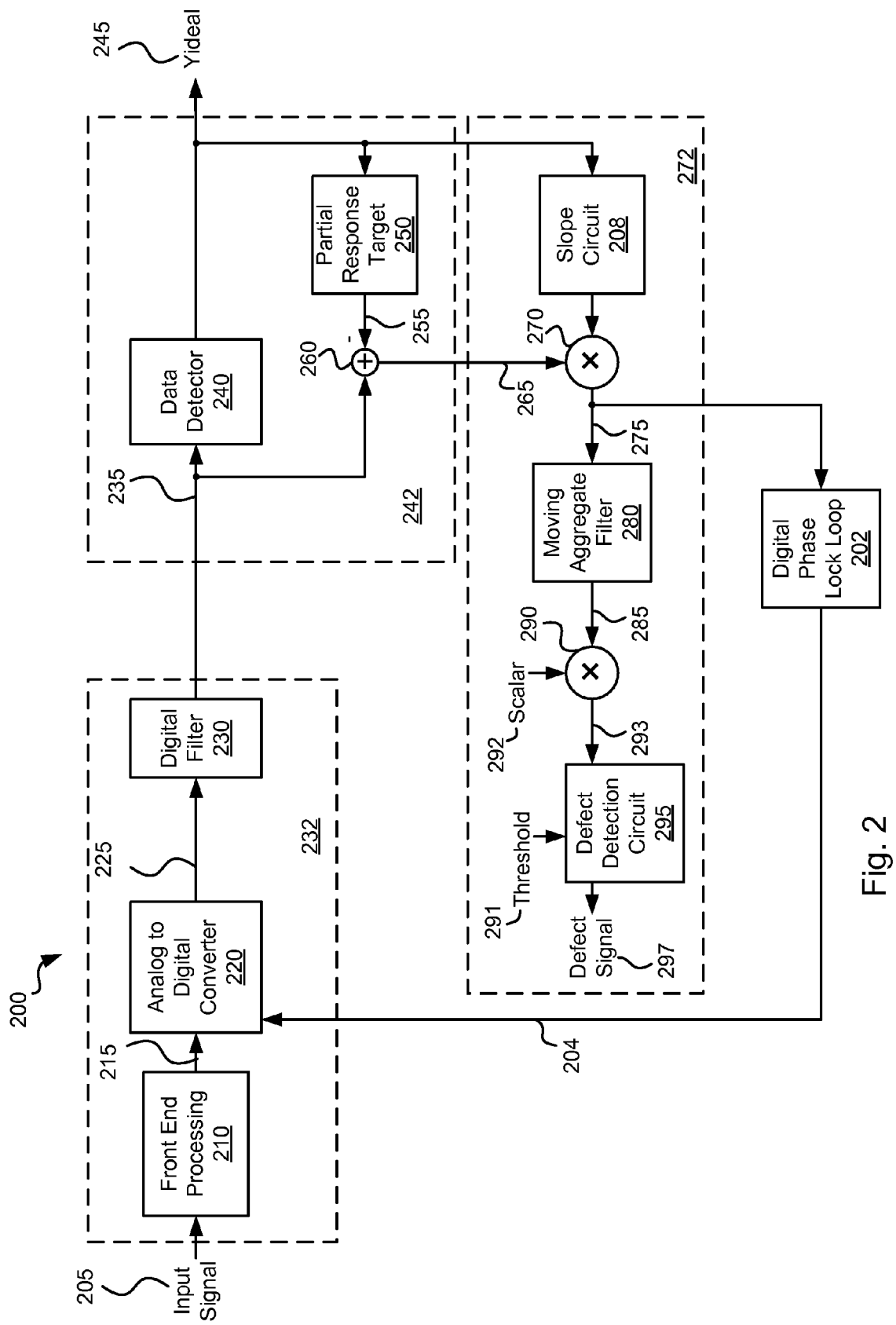
FIG. 2 shows a flaw scan circuit in accordance with various embodiments of the present invention.

Turning to FIG. 2, a flaw scan circuit 200 is shown in accordance with various embodiments of the present invention. Flaw scan circuit includes an input circuit 232 (outlined using dashed lines), a data processing circuit 242 (outlined in dashed lines), and a defect detection circuit 272 (outlined in dashed lines). As shown, input circuit 232 includes a front end processing circuit 210, an analog to digital converter 220, and a digital filter 230. Front end processing circuit 210 receives an analog input signal 205 and provides a modified analog output 215. Front end processing circuit 210 may include any circuitry designed to filter and otherwise massage an analog input signal. In one particular embodiment of the present invention, front end processing circuit 210 includes a pre-amplifier (not shown) and an analog filter (not shown). Based upon the disclosure provided herein, one of ordinary skill in the art will recognize a variety of front end processing circuits that may be used in relation to different embodiments of the present invention. Analog input signal 205 may be derived from, for example, a magnetic storage medium via a read/write head assembly. Based upon the disclosure provided herein, one of ordinary skill in the art will recognize other sources for analog input signal 205.

Modified analog output 215 is provided to analog to digital converter 220 that converts modified analog output 215 to a corresponding series of digital samples 225. Analog to digital converter 220 samples modified analog output 215 at a sampling frequency governed at least in part by a feedback signal 204 from a digital phase lock loop circuit 202 as is known in the art. Digital samples 225 are provided to a digital filter 230 that filters the digital input and provides a filtered output 235. In some embodiments of the present invention, digital filter 230 is a digital finite impulse response filter as are known in the art. In one particular case, the digital finite impulse response filter is a ten tap filter as is known in the art.

Filtered output 235 is provided to data processing circuit 242. Data processing circuit 242 includes a data detector circuit 240, a partial response target filter circuit 250, and a summation element 260. Data detector circuit 240 applies a data detection algorithm to filtered output 235 and provides an ideal output (Yideal) 245. Data detector 240 may be any data detector/decoder that is known in the art. For example, data detector 240 may be, but is not limited to, a Viterbi algorithm detector as are known in the art. Ideal output 245 is provided to partial response target filter circuit 250 as are known in the art. In some embodiments of the present invention, partial response target filter circuit 250 is a digital finite impulse response filter, and in particular cases, a three tap digital finite impulse response filter is used. A target output 255 from partial response target filter circuit 250 is provided to summation circuit 260 where it is subtracted from a time aligned version of filtered output 235. Summation circuit 260 operates as a comparator providing a difference between two inputs.

The result of the aforementioned subtraction is an error output 265 that is provided to defect detection circuit 272. Errors occurring when the slope of ideal output 245 is large are more significant. To weight a series of error outputs according to their corresponding slope, a slope of ideal output 245 is determined by a slope circuit 206 as is known in the art. A slope output 208 from slope circuit 206 is provided to a multiplication circuit 270 that multiplies error output 265 by slope output 208. The resulting product (scaled error) 275 is provided in parallel to a moving average filter circuit 280 and a digital phase lock loop circuit 202.

Assuming errors only derived from timing, product 275 (i.e., the slope adjusted error feedback) is driven to zero by correcting the phase/frequency of sampling performed by analog to digital converter 220. Digital phase lock loop circuit 202 modifies feedback signal 204 such that the phase and/or frequency of the sampling period of analog to digital converter 220 adjusts to drive error output 265 toward zero. Digital phase lock loop circuit 202 may be any clock phase/frequency adjustment circuit known in the art.

Moving aggregate filter circuit 280 performs a moving aggregate of the received products 275. In some embodiments of the present invention, moving aggregate filter circuit 280 uses a first-in/first-out memory element (not shown) receiving the series of products 275. An aggregate of the stored entries is provided as an aggregate value 285. In some cases, aggregate value 285 is divided by the number of values incorporated in the value such that it is a moving average value. In normal operation once the phase/frequency of the sampling clock of analog to digital converter 220 is stabilized, the series of products 275 are expected to be relatively small, and oscillate around a zero point. Thus, during normal operation, aggregate output 285 is approximately zero. In contrast, when a severe phase shift is exhibited by analog input signal 205, a significant increase in subsequent products 275 will occur. This increase will gradually reduce over time as digital phase lock loop circuit 202 modifies feedback signal 204 such that error signal 265 decreases.

Aggregate output 285 is provided to a multiplication circuit 290 where it is multiplied by a scalar value 292. A resulting product 293 from multiplication circuit 290 is provided to a defect detection circuit 295. Product 293 may be a moving average or a scaled moving average and may be generically referred to as a filtered error. In some cases, scalar value 292 is the inverse of the number of values included in aggregate value 285. As such, product 293 is a scaled moving average. Defect detection circuit 295 compares product 293 (i.e., scaled moving average) with a threshold value 291. Once product 293 exceeds threshold value 291, a defect signal 297 is asserted. Based upon defect signal 297, a region around the area where the defect was detected is mapped out (i.e., designated in a table as not usable). Such mapping out may be done using any mapping process known in the art.

It should be noted that the rate at which products 275 decreases depends in part on the rate at which digital phase lock loop 202 can respond. Thus, the number of samples included in aggregate output 285 and the level of threshold 291 are a function of the rate at which digital phase lock loop circuit 202 can recover. For example, where the recovery period of digital phase lock loop circuit 202 is long, moving aggregate filter 280 may be relatively long and threshold 291 may be relatively large. In contrast, where the recovery period of digital phase lock loop circuit 202 is short, moving aggregate filter 280 may be relatively short and threshold 291 may be relatively small. Based upon the disclosure provided herein, one of ordinary skill in the art will recognize a variety of combinations of the level of threshold 291 and the length of moving aggregate filter 280. It should also be noted that flaw scan circuit 200 may reuse (or simultaneously use) various components and/or circuits included in a standard read channel circuit. For example, a read channel circuit may include an analog to digital converter, a digital filter, a data detector and other elements. In some embodiments of the present invention.

In operation, flaw scan circuit 200 receives analog input signal 205 and processes it using an analog front end processing circuit 210. Modified analog output 215 is converted to a series of digital samples 225 using analog to digital converter 220. Digital samples 225 are digitally filtered 230, and filtered output 235 is provided to data detector 240. Data detector 240 and partial response target filter circuit 250 attempt to recreate the data originally written from which analog input signal 205 is derived.

During each sample period, error signal 265 is calculated by subtracting target output 255 from filtered output 235. It should be noted that filtered output 235 is typically delayed to align it with a corresponding instance of target output 255. Error signal 255 is then multiplied by the slope of ideal output 245 from data detector 240. The multiplication provides a product 275 for each sample period. Each of products 275 are used by digital phase lock loop 202 to correct the sampling phase/frequency of analog to digital converter 220. In addition, each of products 275 are added together by a moving aggregate filter circuit 280 to create aggregate output 285.

Moving aggregate output 285 is updated each sample period, and is continually multiplied by a scalar value 292. A product 293 of the multiplication is continuously compared against a threshold value 291 using defect detection circuit 295. Where threshold value 291 is exceeded, defect signal 297 is asserted. For non-defective regions, product 293 remains relatively small and thus a defect is not indicated. In contrast, a defective region on a storage medium will often exhibit a change in susceptibility to magnetic information. This change in susceptibility results in a phase shift that causes a sudden and dramatic increase in product 275. This increase in product 275 continues for a number of sample periods causing the value of moving average output 285 to increase over time. At some point, the value of moving average output 285 multiplied by scalar value 292 exceeds threshold 291 and defect signal 297 is asserted.

Figure 3A:
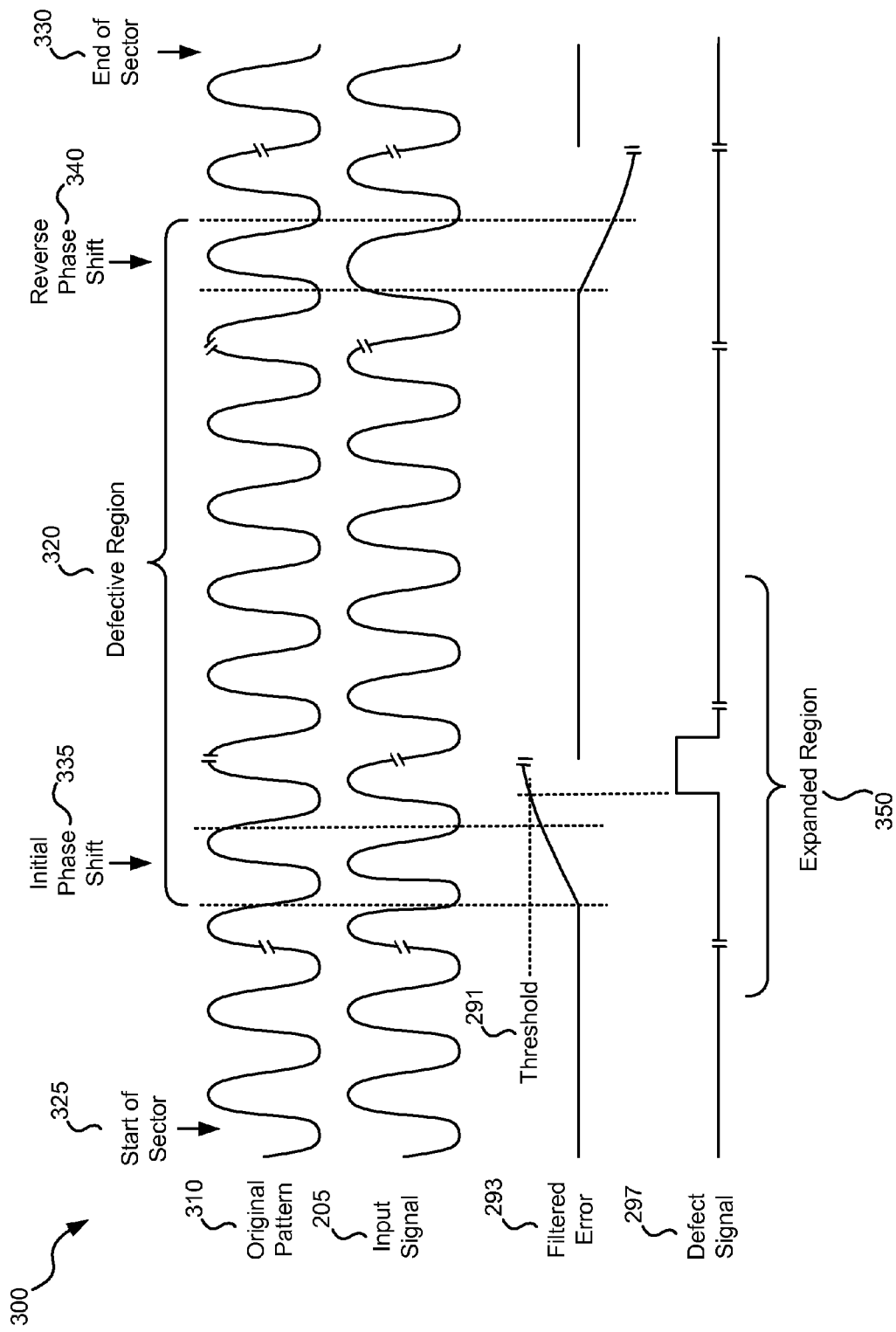
FIG. 3a is a timing diagram depicting an exemplary operation of the flaw scan circuit of FIG. 2 in accordance with some embodiments of the present invention.

Turning to FIG. 3a, a timing diagram 300 shows an exemplary operation of flaw scan circuit 200 in accordance with some embodiments of the present invention. Timing diagram 300 includes an original pattern 310 representing periodic data that was originally written to a storage medium. In addition, timing diagram 300 includes analog input signal 205 that corresponds to repeating pattern 301 as read back from the storage medium. As shown, during a defective region 320 at some point between a start of sector 325 and an end of sector 330, an initial phase shift 335 corresponding to the beginning of defective region 320 and a reverse phase shift 340 corresponding to the end of defective region 320.

The phase shifts are due to a change in susceptibility to magnetic information. Thus, where original pattern 310 was written to the storage medium, during defective regions (i.e., regions of non-standard magnetic susceptibility) the timing when the information is sensed will change. This results in the phase shift indicative of the defective region. Once the defective region has passed, a reverse of the initial phase shift is exhibited. During initial phase shift 335, scaled moving average 293 begins to increase with an addition consecutive scaled error values 275. It should be noted that for consecutive scaled error values 275 that are negative due to an opposite phase shift from that shown, scaled moving average 293 decreases. The same threshold magnitude may be compared to determine a defective region. Once the value of scaled moving average 293 exceeds threshold 291, defect signal 297 is asserted.

At the end of defective region 320 during reverse phase shift 340, a reverse process occurs where a reverse phase shift occurs during the transition from the defective region to a subsequent region. During this reverse phase shift, scaled error values 275 are the opposite polarity of those found during initial phase shift 335. This results in a decreasing value of scaled moving average 293 for a period until the phase shift is compensated using digital phase lock loop circuit 202. Once compensated, scaled error values 275 are near zero and the moving average filter circuit 280 eventually returns scaled moving average 293 to near zero. In some cases, the reverse process is not compared against a threshold as a region substantially larger than the defective region is ultimately mapped out. In other cases, the reverse process is compared against a threshold to identify the end of the defective region.

Figure 3B:
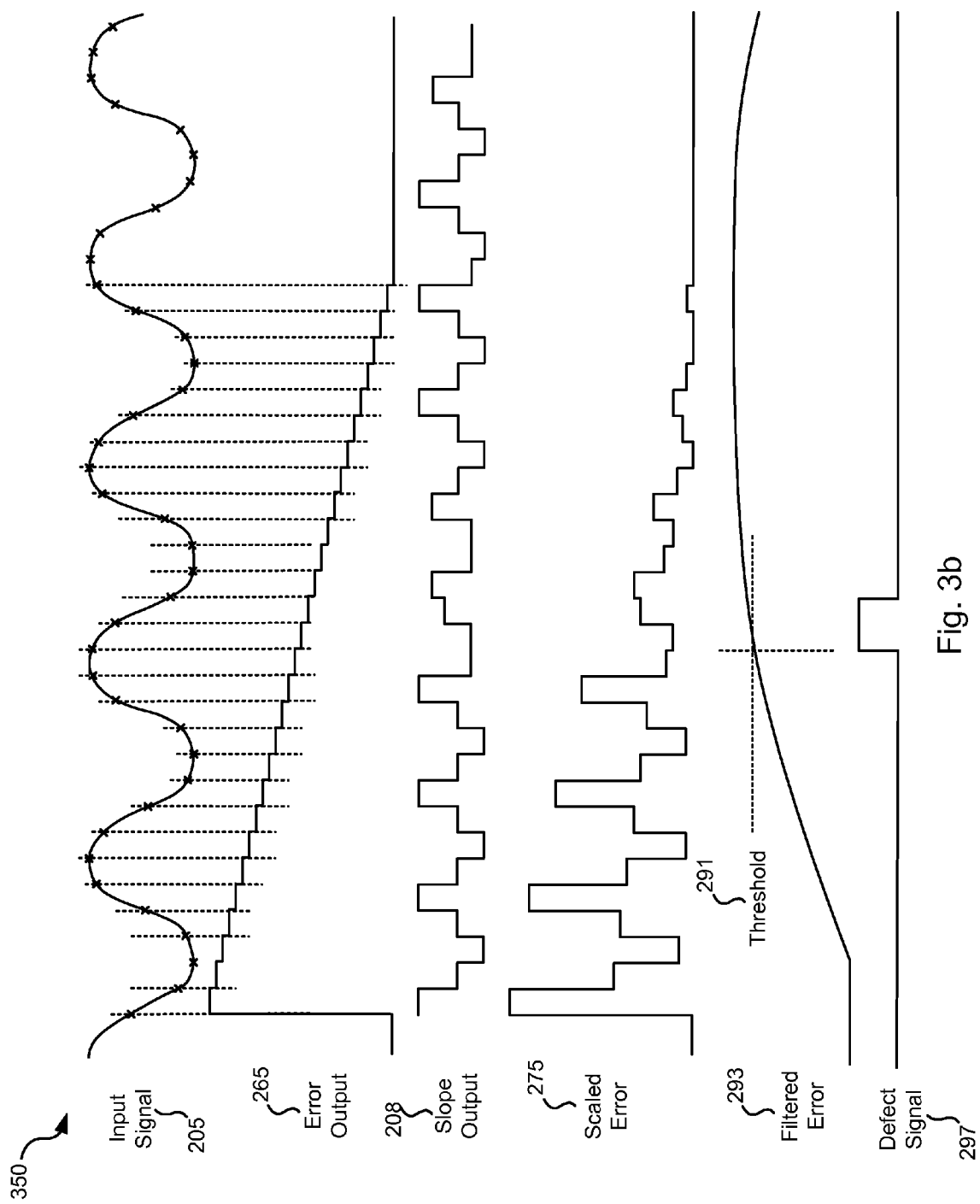
FIG. 3b is a timing diagram showing a more detailed view of the exemplary operation shown in FIG. 3a in accordance with some embodiments of the present invention.

An expanded region 350 is shown on timing diagram 300. Expanded region 350 is shown in greater detail in FIG. 3b. As shown, analog input signal 205 is sampled a number of times as indicated by cross-hairs on the wave form. For each sample, a value for error output 265 is calculated. As shown, when the initial phase shift is detected, error output 265 increases dramatically. Then, assuming no other error sources, the magnitude of error output 265 decreases as each subsequent sample as digital phase lock loop circuit 202 adjusts the sampling point to match the phase/frequency of analog input signal 205. The rate at which the magnitude of error output 265 changes is governed by the rate at which digital phase lock loop circuit 202 adjusts the sampling feedback.

As shown, the magnitude of slope output 208 changes for each sample. In particular, slope output 208 is relatively large when the sample corresponding to slope output 208 occurs near a zero crossing of analog input signal 205, and relatively small when the sample occurs near a peak of analog input signal 205. Error output 265 is multiplied by slope output 208 to yield scaled error 275. Scaled error is largest when slope 208 and error output 265 are large, and is small when either slope 208 is small and/or error 265 is small. Once digital phase lock loop circuit 202 has adjusted such that error output is approximately zero, scaled error 275 goes to approximately zero.

Successive values of scaled error 275 are incorporated into scaled moving average 293. Thus, when the values of scaled error 275 are substantially greater than zero, scaled moving average 293 is increasing as higher values replace lower values in the average. The opposite is true where the values of scaled error 275 are substantially less than zero. Once scaled error 275 begins to return to near zero values, scaled moving average 293 begins to decrease toward zero as lower values begin replacing higher values in the average. Scaled moving average 293 is continuously compared with a threshold value 291. Where threshold value 291 is exceeded, defect signal 297 is asserted. In some cases, such as that shown, defect signal 297 is asserted for only a short period. In other cases, defect signal 297 remains asserted until the reverse phase shift is detected. Based upon the disclosure provided herein, one of ordinary skill in the art will recognize a variety of approaches that may be employed for asserting and de-asserting defect signal 297 when scaled moving average 293 exceeds threshold 291.

Figure 4:
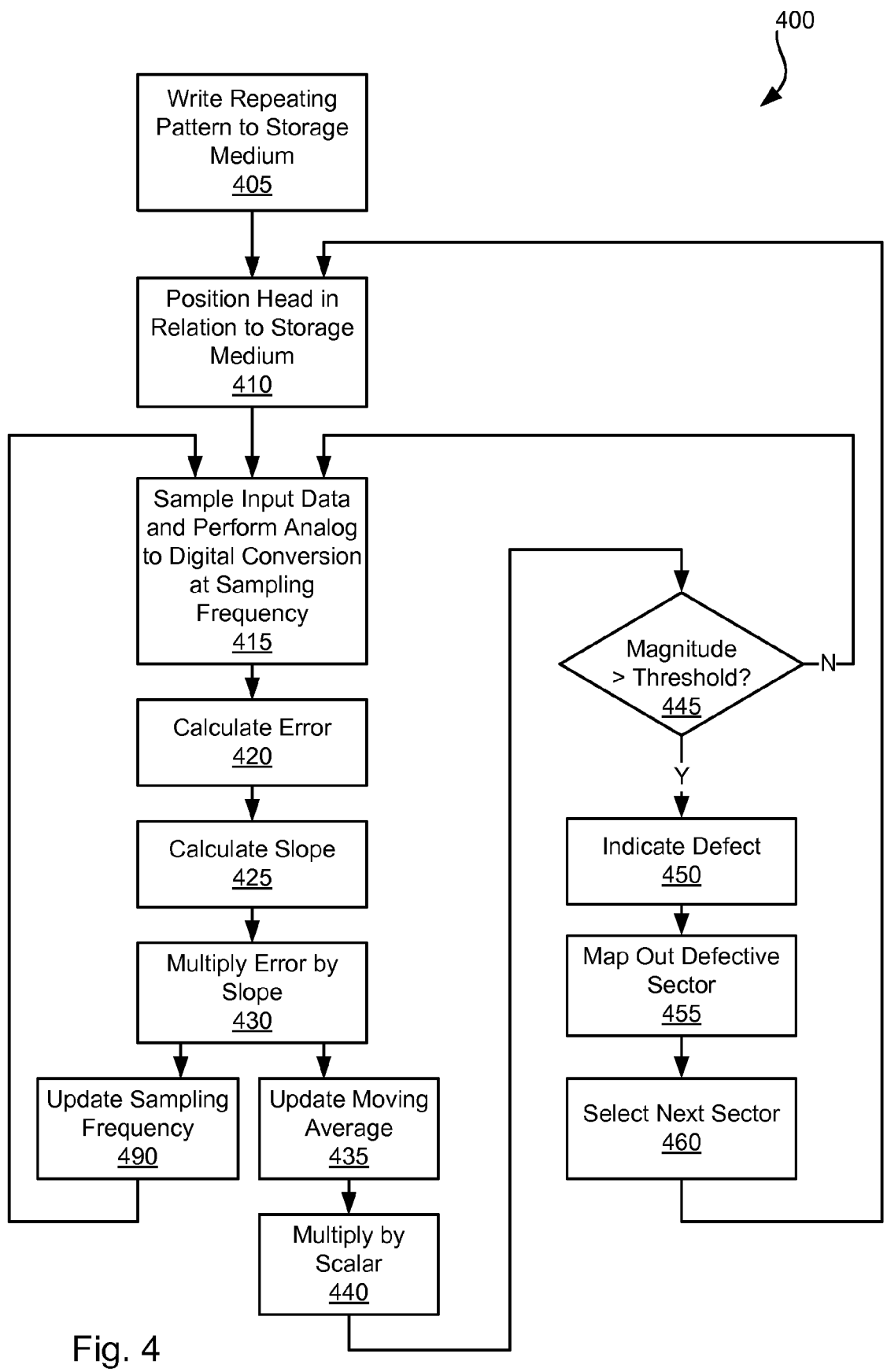
FIG. 4 is a flow diagram showing a method for flaw detection in a storage medium in accordance with some embodiments of the present invention.

Turning to FIG. 4, a flow diagram 400 shows a method for flaw detection in a storage medium in accordance with some embodiments of the present invention. Following flow diagram 400, a repeating pattern is written to a storage medium (block 405). The storage medium may be, but is not limited to, a magnetic storage medium, and the pattern may be written using a magneto-resistive head assembly that is disposed in relation to the storage medium. Based upon the disclosure provided herein, one of ordinary skill in the art will recognize a variety of storage media and writing techniques that may be used to store a repeating pattern to the storage medium. In some cases, the repeating pattern may include a series of logic '1s' and logic '0s' that when read back from the storage medium and sampled provide a repeating pattern at an expected frequency with the frequency corresponding to the rate at which transitions from logic states occur.

A read head is positioned in relation to the storage medium (block 410). This may include, for example, selecting a sector from which data is to be read and moving the storage medium and the read head relative to one another such that the read head is disposed over a desired location of the storage medium. Data from the storage medium is sensed by the read head, and an analog to digital conversion of the sensed data is performed at a sampling frequency (block 415). The digital samples are processed using, for example, a digital finite impulse response circuit and a data detector as is known in the art, and an error is calculated (block 420). The error may consist, for example, of a difference between an expected sample determined using a detection algorithm and the sample that was actually received. A slope corresponding to the sample is also calculated (block 425). The slope is greatest where the repeating pattern is near a zero crossing (i.e., is transitioning from one logic state to another) and exhibits its lowest magnitude where the repeating pattern is near peaks (i.e., away from a transition between logic states). The error is then multiplied by the slope to yield a scaled error (block 430).

This scaled error value is used by some type of clock adjustment circuitry to update the sampling frequency and thereby reduce the magnitude of the error calculated in block 420 (block 490). This updated sampling frequency is fed back and used during the analog to digital conversion of subsequent samples. In some cases, this feedback process includes providing the scaled error value to a digital phase lock loop circuit that provides a feedback signal that either moves the sampling phase forward or backward depending upon the sign of the scaled error value and in an amount corresponding to the magnitude of the scaled error value. Based upon the disclosure provided herein, one of ordinary skill in the art will recognize a variety of clock adjustment circuits that may be used in relation to different embodiments of the present invention.

In addition, the scaled error value is incorporated into a moving average (block 435). This includes replacing the oldest value currently incorporated in the moving average with the scaled error value and averaging. In some cases, an actual average is not taken, the new value is merely added in place of the oldest value. The resulting moving average (or sum of scaled error values) is multiplied by a scalar to create a scaled moving average (block 440). In some cases, the scalar performs the function of averaging the added values. Thus, for example, where the moving average includes the fifty most recent scaled error values, the scalar may be ⅟₅₀ to yield an average of the sum of the fifty values. It should be noted that the scalar may be used in addition to any averaging to, for example, scale the value to match a defined threshold.

The scaled moving average is then compared against a threshold (block 445). This may be done, for example, through use of a comparator circuit. Where the threshold has not been exceeded (block 445), the process returns to processing the next sample (block 415). Alternatively, where the threshold has been exceeded (block 445), a defective region is indicated (block 450). In response to identifying a defect, a substantial area surrounding the location where the defect was identified is mapped out (block 450). In some cases, such mapping includes identifying an entire sector where the defect was located as unusable. In other cases, a more refined mapping may be employed where a smaller area associated with the defect is identified as unusable. Based upon the disclosure provided herein, one of ordinary skill in the art will recognize various uses that can be made of an identified defect location. In the case where the entire sector corresponding to the defect is identified as unusable, the next sector is selected for testing (block 460). The head is then repositioned in preparation for subsequent testing (block 410).

Figure 5:
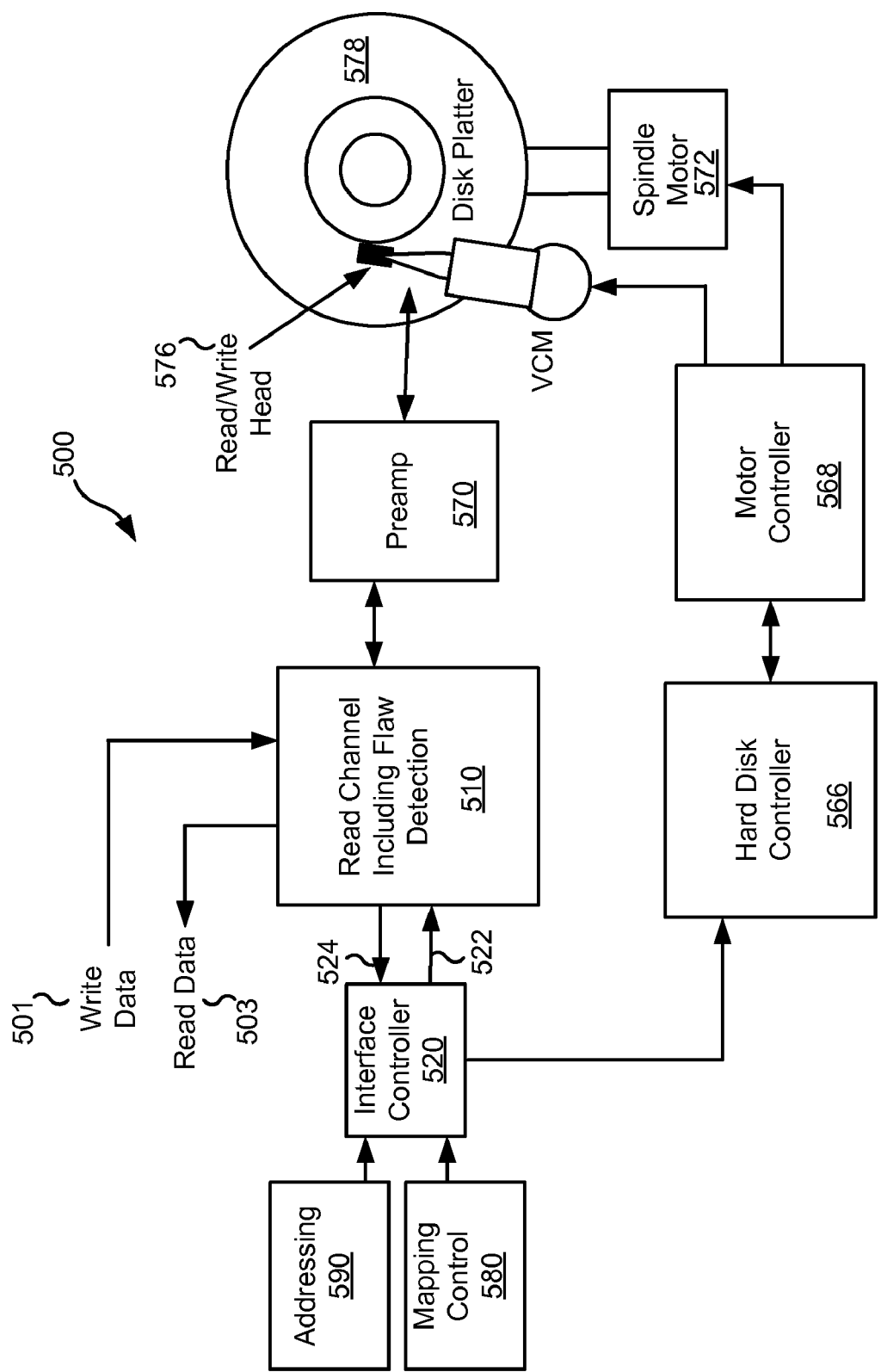
FIG. 5 depicts a storage system including a mapping out circuit and flaw scan circuit in accordance with various embodiments of the present invention.

Turning to FIG. 5, a storage system 500 including a read channel 510 with a flaw detection circuit is shown in accordance with various embodiments of the present invention. Storage system 500 may be, for example, a hard disk drive. The data detector included in read channel 510 is used in relation to the flaw detection circuit and the standard data processing circuit. The incorporated data detector may be any data detector known in the art including, for example, a Viterbi algorithm data detector. Storage system 500 also includes a preamplifier 570, an interface controller 520, a hard disk controller 566, a motor controller 568, a spindle motor 572, a disk platter 578, a read/write head 576, an addressing source 590 and a mapping control module 580. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme.

Addressing source 590 supplies addresses to interface control 520 directing locations on disk platter 578 to which an from which data is to be respectively read and written. Mapping control module 580 is operable to receive indications of one or more regions of disk platter 578 that are defective, and to map the regions such that they are not used as is known in the art. In some cases, addressing source 590 and mapping control module 580 are implemented as part of a general purpose processor that executes instructions to perform the prescribed operations. Based upon the disclosure provided herein, one of ordinary skill in the art will recognize a variety of implementations for addressing source 590 and mapping control module 580 that may be used in relation to different embodiments of the present invention.

In a typical read operation, read/write head assembly 576 is accurately positioned by motor controller 568 over a desired data track on disk platter 578. The appropriate data track is defined by an address received from addressing source 590 via interface controller 520. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 464 via preamplifier 570. Preamplifier 570 is operable to amplify the minute analog signals accessed from disk platter 578. In turn, read channel module 510 decodes and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

Either during manufacture of storage system 500 and/or initial deployment of storage system 500, a periodic pattern is written to disk platter 578. The flaw detection circuit is enabled as the periodic pattern is read back from disk platter 578. Using the process described above in relation to FIG. 4, defective regions of disk platter 578 are identified and mapped out using mapping control module 580. In some cases, read channel 510 may include a circuit similar to that discussed above in relation to FIG. 2 to perform the defect detection process.

In conclusion, the invention provides novel systems, devices, methods and arrangements for reducing low frequency loss in a data detection system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A flaw detection system, the system comprising:
an input circuit, wherein the input circuit is operable to receive an input signal and to provide a filtered output;
a data processing circuit, wherein the data processing circuit is operable to receive the filtered output and to compute a difference between the filtered output and an expected output; and
a defect detection circuit, wherein the defect detection circuit is operable to receive the difference between the filtered output and the expected output and to compare a derivative of the difference with a threshold value, and to assert a defect signal when a magnitude of the derivative of the difference exceeds a threshold value.

2. The system of claim 1, wherein the input circuit includes:
an analog to digital converter, wherein the analog to digital converter is operable to receive an analog input signal and to provide a series of digital samples corresponding to the analog input signal; and
a digital filter, wherein the digital filter is operable to filter the series of digital samples and to provide the filtered output.

3. The system of claim 2, wherein the analog input signal is derived from a periodic data pattern stored on a storage medium.

4. The system of claim 1, wherein the data processing circuit includes:
a data detector, wherein the data detector is operable to receive receives the filtered output and is operable to perform a detection on the filtered output to yield an expected output; and
a comparator circuit, wherein the comparator circuit is operable to determine the difference between the filtered output and the expected output.

5. The system of claim 4, wherein the data detector is a Viterbi algorithm detector.

6. The system of claim 1, wherein the system further comprises:
a slope detector circuit, wherein the slope detector circuit is operable to determine a slope associated with the expected output;
a multiplier circuit, wherein the multiplier circuit is operable to multiply the difference between the filtered output and the expected output by the slope, and wherein the derivative of the difference between the filtered output and the expected output is the product of the multiplier circuit.

7. The system of claim 1, wherein the defect detection circuit includes:
a moving aggregate filter circuit, wherein the moving aggregate filter circuit incorporates the derivative of the difference with a number of preceding derivatives of the difference to yield an aggregate value; and
a comparator circuit, wherein the comparator circuit is operable to assert the defect signal when a magnitude of the derivative of the difference exceeds a threshold value.

8. The system of claim 1, wherein the system further includes:
an analog to digital converter, wherein the analog to digital converter is operable to sample an analog input signal at a sampling frequency and to provide a series of digital samples corresponding to the analog input signal; and a digital phase lock loop circuit, wherein the digital phase lock loop circuit is operable to modify the sampling frequency based at least in part on the derivative of the difference.

9. A method for identifying defects on a storage medium, the method comprising:

providing a storage medium having a pattern;

receiving a series of samples corresponding to the pattern;

calculating an error, wherein the error corresponds to a difference between the series of samples and a series of expected values;

aggregating the error with a number of preceding errors to yield a filtered error value; and asserting a defect signal based at least in part on a comparison between a magnitude of the filtered error value and a threshold.

10. The method of claim 9, wherein the defect signal is asserted when the magnitude of the filtered error value exceeds the threshold.

11. The method of claim 9, wherein the method further comprises:

identifying a region of the storage medium as unusable, wherein the region surrounds a location corresponding to assertion of the defect signal.

12. The method of claim 11, wherein the region is a sector on the storage medium.

13. The method of claim 9, wherein calculating the error includes:

providing a data detector, wherein the data detector applies a data detection algorithm to the series of samples to provide an ideal output;

providing a partial response target filter, wherein the partial response target filter filters the ideal output using a partial response target to yield the series of expected values; and subtracting the series of expected values from the series of samples to yield an interim error, wherein the interim error corresponds to the error.

14. The method of claim 13, wherein the method further comprises:

calculating a slope for each of the values of the ideal output, and wherein the error corresponding to the difference between the series of samples and a series of expected values is interim error multiplied by the slope corresponding to the respective interim error.

15. The method of claim 9, wherein aggregating the error with a number of preceding errors to yield a filtered error value includes:

replacing a preceding value previously included with the number of preceding errors with the interim error; and adding each of the number of preceding errors to yield the filtered error value.

16. The method of claim 15, wherein the filtered error value is further multiplied by a scalar.

17. The method of claim 9, wherein the series of samples is received via an analog to digital converter and a digital filter, and wherein the analog to digital converter samples an analog input corresponding to the pattern at a sampling frequency.

18. The method of claim 17, wherein the method further comprises:

providing a phase lock loop circuit, wherein the phase lock loop circuit is operable to adjust the sampling frequency based at least in part on the error.

19. A flaw detection circuit, the circuit comprising:

a storage medium, wherein the storage medium is operable to store a periodic data pattern;

a read/write head assembly disposed in relation to the storage medium;

an analog to digital converter, wherein the analog to digital converter is operable to receive a signal representing a portion of the periodic data pattern via the read/write head assembly, and to provide a series of digital samples corresponding to the portion of the periodic data pattern;

a digital filter, wherein the digital filter is operable to receive the series of digital samples and to provide a filtered output;

a data detector, wherein the data detector is operable to receive the filtered output and is operable to perform a detection on the filtered output to yield an ideal output;

a first comparator circuit, wherein the comparator is operable to determine a difference between the filtered output to the ideal output;

a slope circuit, wherein the slope circuit is operable to determine a slope of the ideal output;

a multiplier circuit, wherein the multiplier circuit is operable to multiply the difference between the filtered output by the slope to yield a scaled error;

a moving average circuit, wherein the moving average circuit is operable to combine the scaled error with a number of preceding scaled error values to yield a combined value;

a second comparator circuit, wherein the second comparator circuit is operable to assert a defect signal when the combined value exceeds a threshold value.

20. The circuit of claim 19, wherein the moving average circuit includes a first in first out memory maintaining the scaled error and the number of preceding scaled error values.

* * * * *